United States Patent [19]

Tanaka

[11] Patent Number: 4,665,443
[45] Date of Patent: May 12, 1987

[54] SIGNAL RECORDING AND REPRODUCING APPARATUS

[75] Inventor: Masato Tanaka, Minato, Japan

[73] Assignee: Sony Corporation, Tokyo, Japan

[21] Appl. No.: 891,412

[22] PCT Filed: Jun. 18, 1984

[86] PCT No.: PCT/JP84/00317
§ 371 Date: Feb. 12, 1985
§ 102(e) Date: Feb. 12, 1985

[87] PCT Pub. No.: WO85/00069
PCT Pub. Date: Jan. 3, 1985

Related U.S. Application Data

[63] Continuation of Ser. No. 705,333, Feb. 12, 1985, abandoned.

[30] Foreign Application Priority Data

Jun. 18, 1983 [JP] Japan .................. 58-109691

[51] Int. Cl.$^4$ .................. G11B 5/00; G11B 15/48
[52] U.S. Cl. .................. 360/7; 360/74.1; 360/74.4
[58] Field of Search .................. 360/7, 74.1, 74.4

[56] References Cited

U.S. PATENT DOCUMENTS 3,641,502 2/1972 Whiteheed .................. 360/61
4,301,482 11/1981 Trevithick .................. 360/74.4
4,408,234 10/1983 Furura .................. 360/74.4

FOREIGN PATENT DOCUMENTS 48-820 2/1973 Japan .
54-163913 11/1979 Japan .

Primary Examiner—Vincent P. Canney
Attorney, Agent, or Firm—Hill, Van Santen, Steadman & Simpson

[57] ABSTRACT

A signal recording and reproducing apparatus where the signal is recorded in a forward and reverse direction on a magnetic medium such as tape and where the signal to be recorded is supplied to the recording head through a delay circuit with a delay between the recording head and the magnetic tape in the second direction being larger than the signal delay between the head and the tape in the first direction and wherein the difference between these two delays is longer than the time required for tape reversal.

3 Claims, 14 Drawing Figures

SIGNAL RECORDING AND REPRODUCING APPARATUS

This is a continuation of application Ser. No. 705,333, filed Feb. 12, 1985, now abandoned.

TECHNICAL FIELD

This invention relates to a signal recording and reproducing apparatus for recording audio or video signals on a recording medium such as magnetic tape and for reciprocatingly reproducing the recording and, more particularly, to a signal recording and reproducing apparatus in which the direction in which the tape runs during recording or reproduction, can be automatically reversed.

BACKGROUND ART

With a auto-reverse type audio tape recorder, that is, a tape recorder in which the terminal tape portion (tape end) is sensed during recording or reproduction for automatically reversing the tape running direction, the recording or reproduction may be interrupted during the reversal period resulting in the omission of a sound during such time. Since the mechanical operation is involved during the reversing of the rotational direction of the capstan, it is extremely difficult to lower the time required for such reversal to less than 0.1 second, even if the recorder is provided with a fast reverse mechanism. This may cause problems especially when recording and reproducing digital signals obtained by pulse code modulation of the audio signals. In such case, a signal omission over 0.1 second gives rise to an insufficient error correcting function and results in the inability to perform high quality reproduction with the possibility of abnormal sounds occurring.

The present invention contemplates providing a signal recording and reproducing apparatus whereby auto-reverse recording and reproduction are effected without signal omission so as to obtain temporarily-continuous playback signals.

DISCLOSURE OF THE INVENTION

The feature of the signal recording apparatus resides in the signal recording apparatus wherein, after at least one of the recording head and the recording medium has made relative movement relative to the other in a first direction, it is moved in a second direction opposite to said first direction for reciprocatingly recording input signals on said recording medium, wherein, according to the invention, means are provided for supplying said input signals to said recording head with a delay, and the amount of delay quantity in the input signals during running in said second direction is set to be longer than the delay in the input signals during running in said first direction, and the difference between these delays is set to be longer than the time required for the tape reversal from said first direction to said second direction.

The feature of the signal recording and reproducing apparatus according to the present invention resides in apparatus wherein, after at least one of the recording head and the recording medium has relative movement relative to the other in a first direction, it is moved in a second direction opposite to said first direction so as to reciprocatingly recording input signals, and the thus reciprocatingly recorded recording medium is caused to travel in said first and second directions for reproducing the recording with a reproducing head, wherein, according to the invention, during recording, means are provided for supplying said input signals to said recording head with a delay, and the delay in the input signals during running in said second direction is set to be longer than the delay in the input signals during running in said first direction and the difference the delay is set so as to be longer than the time required for the tape reversal from said first direction to said second direction. During reproduction, means are provided for delaying the reproduced signals from said reproducing head, with the delay of the reproduced signal prior to the movement reversal being set to be longer than the delay of the reproduced signal after the movement reversal, and the output from said delay means is removed as substantially continuous signals.

The feature of the signal recording apparatus according to the present invention is that input signals are reciprocatingly recorded on the recording medium, and, according to the invention, reversal marking signals indicative of the reversal are recorded on said recording medium in the vicinity of the reversal position along with said input signals.

In addition thereto, the feature of the signal recording and reproducing apparatus according to the present invention, is that, the input signals and the addresses corresponding thereto are reciprocatingly recorded on a recording medium and, the thus recorded signals are read out in both the forward and return directions during forward reproduction and wherein the thus read out forward direction addresses and return direction addresses are compared to each other for determining the movement reversal position from the forward reproduction to the return reproduction.

BEST MODE FOR EXECUTING THE INVENTION

The signal recording and reproducing apparatus of the present invention is now described.

Figure 1:
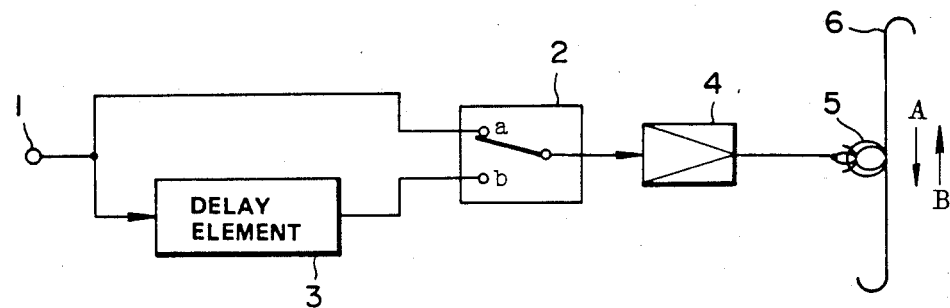
FIG. 1 is a block circuit diagram showing the basic construction of the recording part of the signal recording and reproducing apparatus of the present invention.

FIG. 1 is a block diagram for explaining the operating principle of the recording part of the signal recording and reproducing apparatus. In FIG. 1, audio, video or other common data signals are supplied to an input terminal 1 in a digital signal format. These input signals are supplied to a selected first terminal a of a changeover switch 2, and are also supplied to a selected second terminal b of the switch 2 through a delay element 3 consisting of a memory such as shift register or random access memory (RAM). The output from the changeover switch 2 is supplied through a recording amplifier 4 to a recording head 5 so as to be recorded on a recording medium such as a magnetic tape 6. The tape 6 is caused to run in a first direction relative to the magnetic head 5, e.g. in the direction shown by the arrow A. When the tape has reached the tape end position, for example, the tape is caused to run in a second direction opposite to the first direction, e.g. in the direction shown by the arrow B. The changeover switch 2 is set to the selected first terminal a when the tape 6 runs in the first direction or the direction shown by the arrow A and to the selected second terminal b when the tape 6 runs in the second direction or the direction shown by the arrow B. It should be noted that the element 3 has a delay time $T_D$ longer than the time $T_R$ required for reversing the movement of the tape 6 from the first direction to the second direction (time of movement reversal) so that the signal appearing at the magnetic head 5 immediately after such movement reversal temporarily precedes the input signal immediately before the movement reversal. When the input signal is an analog signal on, analog delay element such as a bucket brigade device (BBD) or charge coupled device (CCD) may be used as the aforementioned delay element 3.

Figure 2:
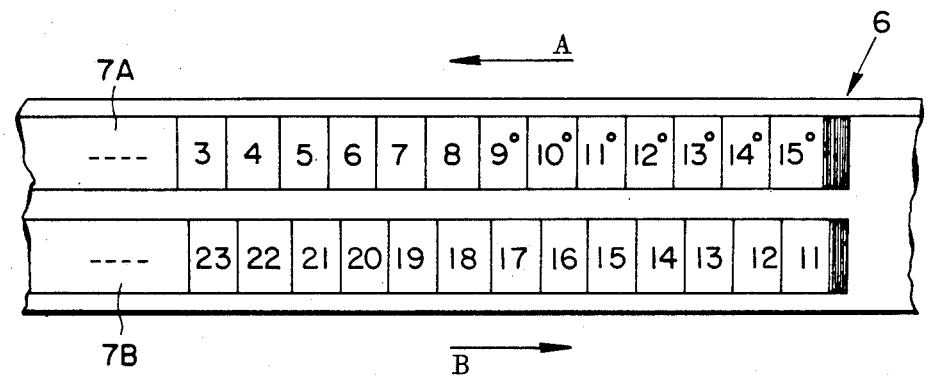
FIG. 2 is a plan view showing an example of the recording pattern on the magnetic tape.

The recording pattern on the magnetic tape 6 at the time of recording accompanying such movement reversal is shown for example in FIG. 2. In FIG. 2, the two recording tracks 7A, 7B on the magnetic tape 6 are formed in accordance with the recording in the aforementioned first and second directions (forward and return directions) in such a manner that the track 7A is formed when the tape 6 runs in the first direction (in the direction of the arrow A) relative to the recording head 5, and the track 7B is formed when the tape 6 runs in the second direction (in the direction of the arrow B). When the tape 6 is assumed to remain stationary, the head 5 has a relative movement thereto in opposite directions, i.e. in the directions shown by the arrows A or B. In FIG. 2, the numbers entered in the tracks 7A, 7B represent the numbers (or addresses) of temporarily consecutive blocks of the input signals, and the right side extreme portions of the tracks 7A, 7B represent invalid record portions corresponding to tape acceleration or deceleration during movement reversal.

It is assumed that, with one block time (block period) $T_B$ on the time axis, the time $T_R$ required for movement reversal is equal to four blocks time $4 T_B$, whereas the delay time $T_D$ of the delay element 3 is equal to eight blocks time $8 T_B$.

In such case, the input signal supplied to the input terminal 1 appears directly (i.e. with zero delay time) at the terminal a of the changeover switch 2 of FIG. 1, whereas the input signal delayed by eight blocks time $8 T_B$ appears at the terminals b of the change-over switch 2. When the tape 6 runs in the first direction A (forward direction) the switch 2 has been set to the terminal a so that the input signal is delivered directly to the magnetic transducer head 5 and is sequentially recorded on the first recording track 7A of the magnetic tape 6. Supposing that the tape has reached the terminal position at the time when the 15th block has been recorded, an automatic movement reversal takes place during the time interval $T_R$ ($=4 T_B$) and the tape starts to run in the second direction B. At this time, the switch 2 is set to the terminal b and the signal corresponding to the input signal delayed by $T_D$ ($=8 T_B$) is delivered to the head 5 and is sequentially recorded on the second track 7B of the tap 6. The input signal supplied to the input terminal 1 immediately after such movement reversal is the 19th block signal which is delayed by $4 T_B$ from the 15th block appearing immediately before the movement reversal. However, the output signal from the delay element 3 is the 11th block signal which is earlier by eight blocks ($8 T_B$) so that the signals are sequentially recorded on the second recording track 7B of the tape 6 starting from the 12th block. Thus the four blocks from the 12th to the 15th blocks are doubly or redundantly recorded before and after the movement reversal so as to prevent signal omissions. It is possible to set the delay time $T_D$ of the delay element so as to be equal to the time $T_R$ required for movement reversal ($T_D=T_R$) for preventing signal omission. However it is desirable to set the delay time to be greater than the time required for movement reversal $T_R$ ($T_D>T_R$) and to utilize the time difference $T_D-T_R$ as a time margin or allowance while considering that fluctuations may be caused during the time required for reversal and in the reversal position because of the mechanical means used for effecting the movement reversal and errors caused in tape end detection.

Although the signal delay is effected in the embodiment of FIG. 1 only for the recording in the second direction, it is also possible that a similar delay of the input signals be introduced for recording in the first direction. For example, with a signal delay time $T_{DA}$ for the recording in the first direction and with a signal delay time $T_{DB}$ for recording in the second direction, if the delay time intervals $T_{DA}$, $T_{DB}$ are set so that the time $T_D$ is equal to the difference between these delay intervals or the time $T_{DB}-T_{DA}$ is longer than the time required for movement reversal $T_R$ ($T_D=T_{DB}=T_{DA}>T_R$), recording without omission of input signals can be achieved.

When the signal delay time intervals are switched between the recording in the first direction and that in the second direction, it is not necessary to effect switching between the two signal delay elements using hardware. For example, it is sufficient that a delay element such as a random access memory (RAM) be provided and the difference between the write and read addresses for recording in the first direction is set so as to be different from that for the recording in the second direction in order to provide for the different signal delay times in writing and reading to and from the RAM.

In general, when signals to be recorded are the digital signals obtained by pulse code modulation of the sampled values of the audio or video signals, delay elements such as memories are already employed for signal processing such as for word interleaving or for error correction coding. In such cases, it is more practical that these memories which are used for signal processing (e.g. encoding) be used simultaneously as the signal delay element 3 during the above described tape reversal. Although the delay elements 3 are included in the signal processing circuit, it is of course possible that the delay elements be provided ahead of or in back of the encoder.

The recording tracks 7A, 7B of the patterns shown in FIG. 2 are formed on the magnetic tape 6 by the signal recording process described in the foregoing. When the thus recorded magnetic tape 6 is reciprocatingly reproduced by an automatic movement reversal (auto-reverse), and assuming that the tape is reversed after recording up to the 15th block in the first direction, the 12th to 15th blocks will be reproduced redundantly (will be produced twice) during reproduction in the second direction, which means an increased signal delay memory capacity.

Thus, with the signal recording and reproduction apparatus of the present invention, not only the block addresses for the first direction but those for the second direction are read out during reproduction in the first direction and the block addresses for the first and second directions are compared for deciding the optimum reversal position.

Figure 3:
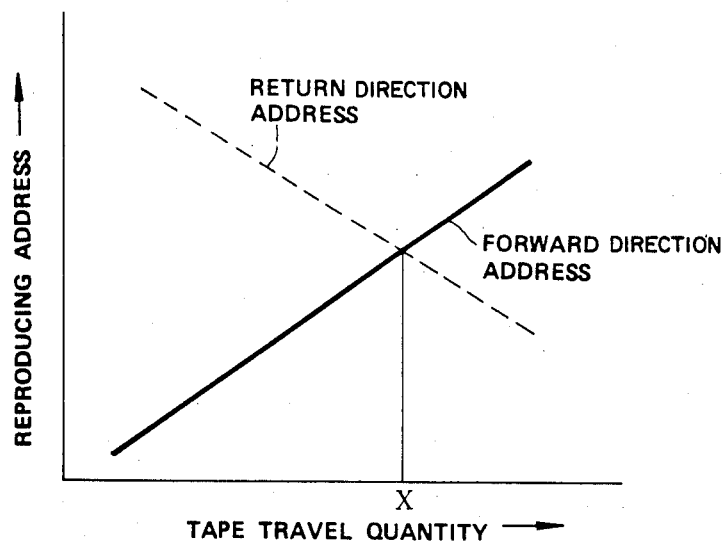
FIG. 3 is a chart showing changes in the forward direction addresses and the return direction addresses relative to the amount of tape travel.

Thus, when the tape is running in the first direction A for reproduction in the forward direction each block address for the forward and reverse directions are changed with direction which the tape runs in the manner as indicated in FIG. 3. In FIG. 3, the forward direction addresses indicated by the solid line are incremented while the return direction addresses are decremented with increase in the amount of tape travel. The tape running position X immediately after the forward direction addresses and the return direction addresses are the same. The X position comprises an optimum running reversal position and provides for good reproduction of the recorded signal data without omissions and also provides for a minimum delay memory capacity.

Figure 4:
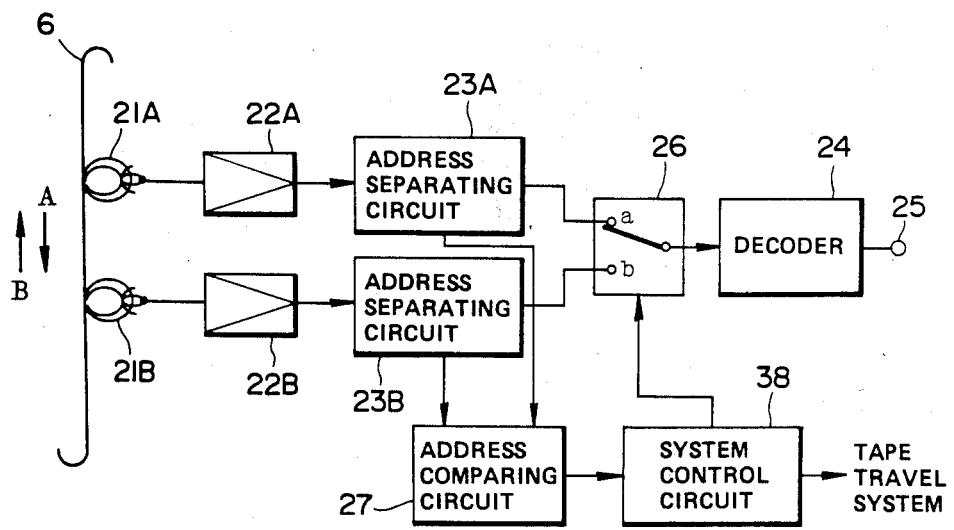
FIG. 4 is a block circuit diagram showing the basic construction of the reproducing part of the signal recording and reproducing apparatus of the present invention.

The basic construction for effecting automatic tape movement reversal during reproduction is shown by way of an example in FIG. 4. In FIG. 4, the recording track 7A of the magnetic tape 6 recorded by the above described recording method is reproduced by a forward reproducing head 21A, and the recording track 7B is reproduced by the return reproducing head 21B. The reproducing signals from these heads 21A, 21B are amplified by reproducing amplifiers 22A, 22B, respectively, and supplied to the selected terminals a, b of the change-over switch 26, respectively, through address separating circuits 23A, 23B, respectively. During forward direction reproduction, the switch 26 is set to the terminal a and only the reproduced signals from the address separating circuit 23A are supplied to the decoder 24 for decoding. These include signals which have been delayed and the signals are delivered to the output terminal 25. The address separating circuits 23A, 23B are used for extracting forward and return route addresses from the playback signals from the respective tracks 7A, 7B. The forward and return direction addresses are extracted in this manner and are compared to each other so as to determine the relative signal magnitudes in the address comparing circuit 27. When the forward direction address is equal to or larger than the return direction address, the optimum reversing position signal is supplied to a system control circuit 38. The optimum reversing position is situated, for example, at the 14th block playback position in the forward track 7A in the recording pattern shown in FIG. 2. In response to the detection of the optimum reversing position, the system control circuit 38 operates to reverse the tape running direction and to move the changeover switch from terminal a to terminal b. Thus, during the return reproduction following the tape reversal, the playback signals from the return direction reproducing head 21B are supplied via amplifier 22B through decoder 24 and are decoded and supplied to the output terminal 25.

It should be noted that the magnetic tape 6 runs in the direction of arrow A during reproduction in the forward direction so that the return direction reproducing head 21B operates to scan the return direction recording track in the opposite direction, and the return direction playback signals are reproduced in reverse time order.

Figure 5:
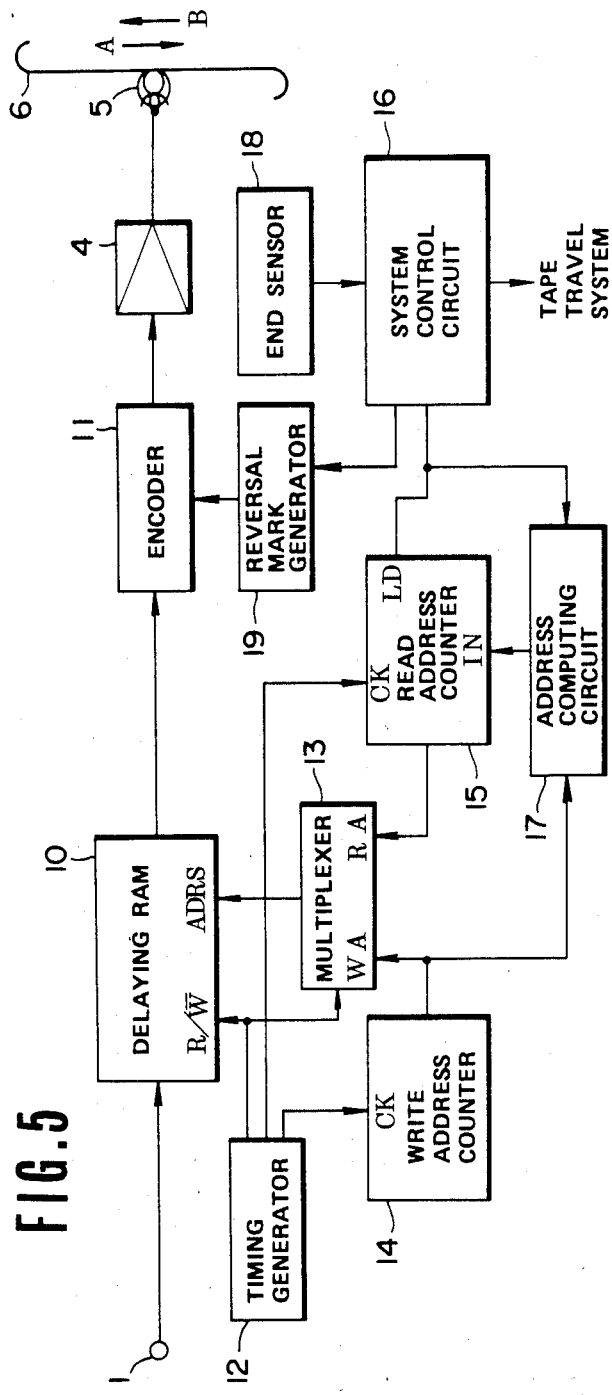
FIG. 5 is a block circuit diagram showing an example of the construction of the signal recording part for explaining an embodiment of the invention.

FIG. 5 is a block circuit diagram showing an example of the more detailed construction of the basic circuit of the recording part shown in FIG. 1. In the present example, a random access memory 10 (RAM) is used as the delay element and the digital signals in block form are sequentially recorded on the magnetic tape.

In FIG. 5, the digital signals obtained from PCM audio signals are supplied in chronological order in block form, and these input signals are supplied to RAM 10 to delay the digital signals and they are written in associated addresses (write addresses). The digital signal data read from associated addresses (read addresses) of the delay RAM 10 are supplied to a recording magnetic transducer head 5 through an encoder 11 and a recording amplifier 4 and are recorded on the magnetic tape 6 which is the magnetic recording medium.

A timing generator 12 in FIG. 5, supplies read/write control signals R/W for controlling reading from and writing into the RAM 10 during the entry of one block signals, and these control signals R/W are supplied to the switching control terminals of a multiplexer 13 and to the delaying RAM 10, respectively. The function of the multiplexer 13 is to make a selection between the write address input WA and the read address input RA in accordance with the control signal R/W so as to send the selected output signal to an address input terminal of the RAM 10. The write address WA is outputted from a write address counter 14 and the read address RA is outputted from a read address counter 15. To the clock input terminals CK of these counters 14, 15 there are supplied clock pulses of the aforementioned block period from the timing generator 12. The read address counter 15 also operates to output input address data from an address computing circuit 17 which have not been altered in response to commands from the system control circuit 16. The circuit 16 operates to control the reversal of the tape running direction in response to command signals for movement reversal, for example, to the receipt of the tape end detection signals from a tape end sensor 18 which are supplied to the control circuit 16. The circuit 16 also sends out pulses to a load control terminal LD of the read address counter 15 and to control terminals of the address computing circuit 17 for changing the read addresses before and after reversal and for changing the time between the input and output of the delaying RAM 10. Write addresses from the write address counter 14 are supplied to the address computing circuit 17 for computing the post-reversal read addresses. The control circuit 16 also activates a reversal mark generator 19 responsive to input signals such as the aforementioned tape end detection signals, and reversal mark signals are supplied from the generator 19 to an encoder 11. The function of the reversal mark generator 19 is to produce the reversal mark signals which indicates the impending movement reversing position, which reversal mark signals are recorded on the tape along with the input signals. It is preferred that the return direction addresses be detected during forward direction reproduction since it requires a certain time to detect the reversal mark signals to be compared with the forward addresses.

Various forms of the end sensor 18 are known in the art, for example, those based on detection of the tape tension as the tape end is approached, or on optical detection of the taut angle of the tape. Also, for sensing the tape leader at the tape end, it is known to detect the transparent or reflective leader optically or to detect the metallic leader which causes changes in inductance or impedance at the electrode terminal. It is also known to optically detect the through-hole formed in the tape.

The reversal mark signals are outputted from the reversal mark generator 19 from the time of detection of the tape end by the end sensor 18 until the start of the mechanical tape movement reversal, and these signals are supplied to the encoder 11. The reversal mark signals are recorded, along with the input signals, on the terminal portions of the forward track 7A of the magnetic tape 6. For example, the reversal mark and input signals are recorded in the seven blocks from the 9th to the 15th blocks indicated with small circles in FIG. 2. It should be noted that the timing or the time interval at which these reversal mark signals are recorded may be controlled by the system control circuit 16. For example, after the movement reversal has been completed the reversal mark signals may be generated for a certain time (of the order of several block periods) and can be recorded at the beginning portion of the return track 7B (for example, several blocks from the 12th block shown in FIG. 2 towards left).

Figure 6:
FIG. 6 is a diagram showing an example of the block format of the recorded signal.

In the signal delaying RAM 10 of the circuit shown in FIG. 5, the input signals for one block are written into the associated write addresses depending on the command of the write address WA, and the input signals for one block written in the associated read addresses are read out depending on upon the commands of the read address RA. The one-block recording signals are arranged in a format as shown in FIG. 6 and are essentially composed of a block sync signal portion BS, a flag portion FLG which indicates various conditions, a block address portion BA, an input signal data portion DATA, a parity data portion P and an error correcting data portion CRCC, as viewed from the foremost position. The RAM 10 is able to store at least the input signal data portion DATA of the block format in association with an indicating address, while other portions of the format can be supplemented e.g. in the encoder 11. It is however preferred that, since the signal delaying operation is included in the signal processing by the encoder, that the RAM in the encoder be simultaneously used as the signal delaying RAM 10.

For recording the reversal mark signals, one bit of the various status flag portions FLG may be used as a reversal mark bit, in such a manner that the reversal mark bit always (excepting for the reversing position) becomes "0" for indicating other than the reversing position and becomes "1" for indicating the reversing position. Two or more bits may be used so that a binary value is incremented or decremented as the tape approaches the reversing position.

Figure 7:
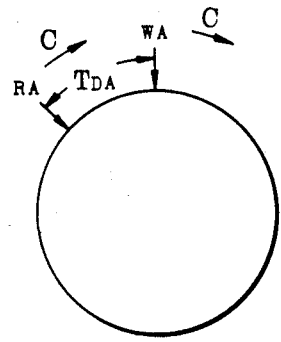
FIGS. 7 to 9 are views for explaining address changes in the signal delaying RAM shown in FIG. 5.
Figure 8:
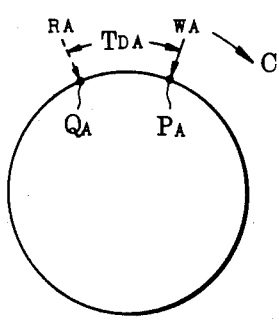
Figure 9:
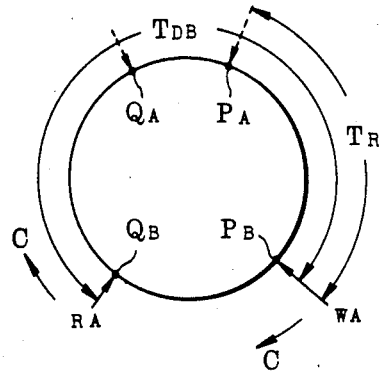

In general, the aforementioned read address RA and the write address WA are indicated by a binary value with e.g. 8 bits. When a sequential access is made to the addresses in the binary representation with the aid of e.g. a binary counter, all the addresses may be considered to the sequentially arranged on a circle as shown in FIGS. 7 to 9 by having access to an all "0" address after having access to an all "1" address. For example, in case of an 8-bit address, addresses 0 to 255 can be sequentially arranged in order with the address 0 arranged next to the address 255 form an endless loop.

FIG. 7 shows the changes of state of the read address RA and the write address WA in the course of the forward direction with the magnetic tape 6 running in the first direction A. Responsive to the count operation of the address counters 14, 15, the addresses RA, WA are moving at equal speeds in the direction of an arrow mark C on a circumference representative of the address space of the RAM 10. The delay time $T_{DA}$ for the forward direction recording is determined by the number of addresses included between the write address WA and the read address RA. One address of the RAM 10 specifies one block of the recording signal and the address is incremented by one for each block period $T_B$, so that, when the address difference (WA−RA) from the address WA to the address RA is, for example, $n_A$, the delay time $T_{DA}$ is equal to $n_A T_B$.

FIG. 8 shows the state in which a reversal command signal is sent during the forward direction recording from the system control circuit 16 to the tape running system responsive to, for example, the tape end detection, that is, the state corresponding to the impending tape reversal. With a position $P_A$ in the RAM address space specified by the write address WA and a position $Q_A$ in the RAM address space specified by the read address signals RA, the difference in the address between these addresses $P_A$ and $Q_A$ is equal to $n_A$ and the delay time is equal to $T_{DA}$ ($=n_A T_B$), as described hereinabove. During tape reversal, the write address WA continues to be moved in the direction of the arrow C at a constant speed for sequentially writing the input signals in the RAM 10 in the above described block sequence. There are, no limitations imposed on the read address RA, which may remain stationary at the position $Q_A$.

Upon the termination of the tape reversal, as shown in FIG. 9, the point specified by the write address WA is $P_B$ which corresponds to a point which has been advanced from the point $P_A$ by a time $T_R$ which is required for tape reversal. The point $Q_B$ specified by the read address RA is at an address position which precedes the aforementioned point $Q_A$. The read address RA and the write address WA are moved in the direction of the arrow C at a speed equal to the pre-reversal speed. The delay time $T_{DB}$ since the time of reading until the time of writing is equal to the product of the block period $T_B$ and the difference $n_B(T_{DB=n_B T_B})$ in the number of addresses from WA to RA. It is necessary that the memory capacity of the RAM 10 and the read address RA immediately after the reversal be set so that the difference in time $T_D$ between the delay time $T_{DB}$ for the return direction recording following tape reversal and the delay time $T_{DA}$ for forward direction recording ($=T_{DB}-T_{DA}$) be larger than the aforementioned time required for tape reversal $T_R$ ($T_D > T_R$). Thus it is required that, on the circumference of FIG. 9 at a position corresponding to the RAM address space that, the position $Q_B$ of the read address RA at the termination of the tape reversal be set so that it is advanced in a direction which is opposite to the direction C, from the position $Q_B$ of the read address RA at the time of the initiation of the tape reversal, and also such that it is ahead of the position $P_B$ of the write address WA in the direction C. Before and after the reversal operation, the input data written in the addresses from the point $Q_B$ to the point $Q_A$ is read out twice and is recorded twice on both the forward direction track 7A and the return direction track 7B.

Figure 10:
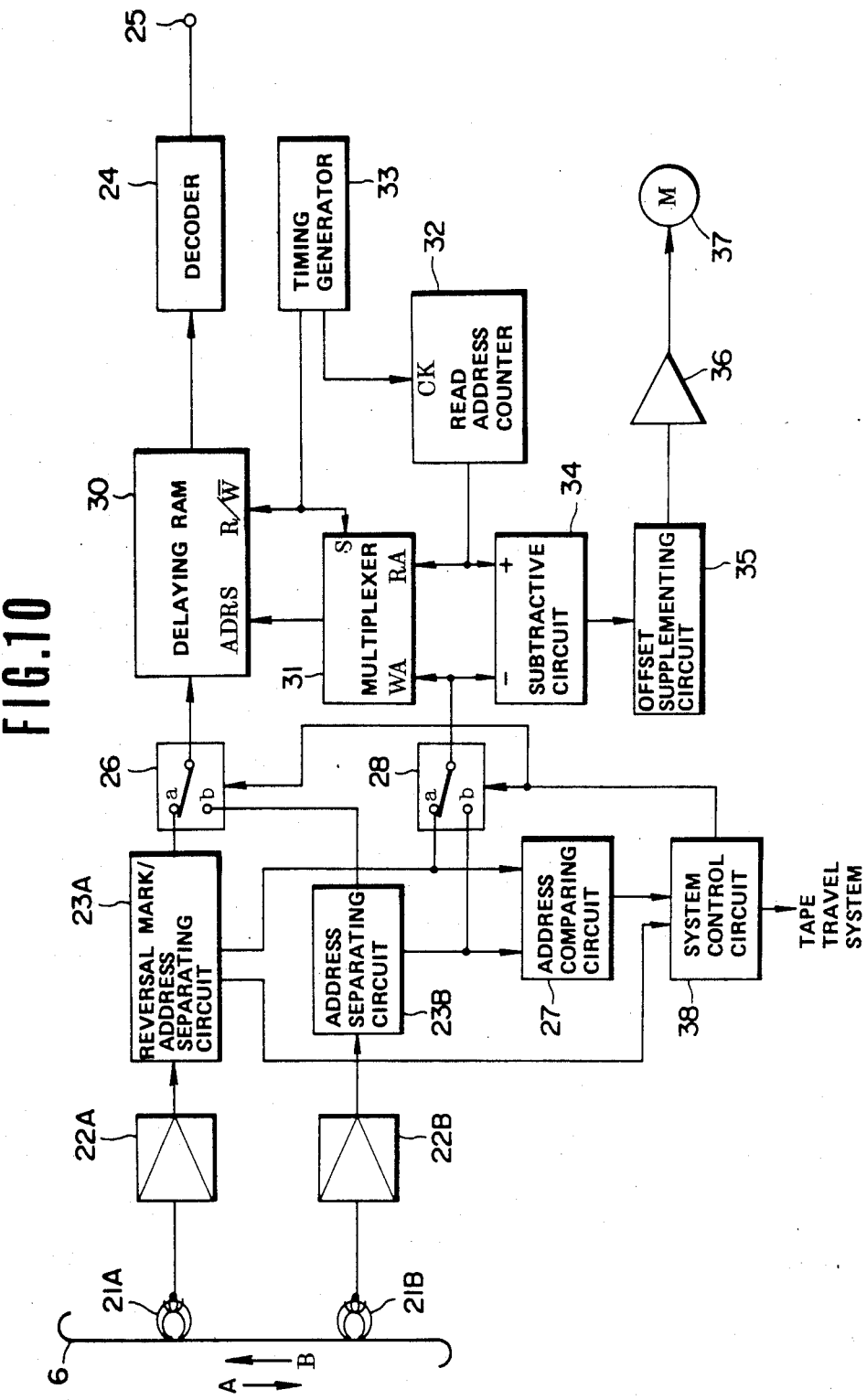
FIG. 10 is a block circuit diagram for explaining an embodiment of the present invention.

In FIG. 10, there is shown in a block diagram a practical circuit by means of which the magnetic tape on which the recording has been made by the signal recording method described in connection with FIG. 5 is reproduced with automatic movement reversal (auto-reverse).

Referring to FIG. 10, reciprocating recording has been made on the magnetic tape 6 with the aid of the recording device of FIG. 5 in accordance with a recording pattern as shown by way of an example illustrated in FIG. 2. The signals recorded on the tape 6 are reproduced by the reproducing transducer heads 21A, 21B and are amplified by the reproducing amplifiers 22A, 22B and thence supplied to the delaying RAM 30 through the reversal mark address separating circuits 23A, the address separating circuit 23B and the change-over switch 26. The signals read out from RAM 30 appear at an output terminal 25 after passing through a decoder 24.

Each signal block read out from the reproducing transducer heads 21A, 21B has the block format shown in FIG. 6. Thus, by sensing the block unit on the basis of the block sync portion BS, the block address portion BA and the reversal mark portion in the various status flags FLG in each block of the reproduced signal can be sequentially taken out at the reversal mark/address separating circuit 23A and the address separating circuit 23B. The block address outputs from the separating circuits 23A, 23B are delivered as write address WA to the multiplexer 31 through the changeover switch 28. The read addresses RA from the read address counter 32 are also introduced into the multiplexer 31, and the read addresses RA or the write addresses WA are occasionally selected depending upon the read/write control signal R/$\overline{\text{W}}$ from the timing generator 33 and are supplied to the address input terminal of the RAM 30. Clock pulses are supplied from the timing generator 33 to the read address counter 32 at a constant block period so that the read address RA appears as a signal sequentially incremented at said constant block period. The read address RA from the read address counter 32 is delivered to a positive input terminal of the subtractive circuit 34. The write address WA from the reversal mark/address separating circuit 23A or the address separating circuit 23B is delivered to the negative input (subtracting input) terminal of the subtractive circuit 34 so that the difference in the addresses (RA−WA) is obtained from the subtractive circuit 34. The subtractive output is delivered to the tape driving motor 37 through an offset supplementing circuit 35 and a servo amplifier 36. The reversal mark detection signals from the reversal mark/address separating circuit 23A is delivered to the system control circuit 38. The block addresses from the address separating circuits 23A, 23B are compared in the address comparing circuit 27, and the detection signal of the aforementioned optimum reversal position is delivered to the system control circuit 38. Responsive to the reversal mark detection signal and the optimum reversal position detection signal, the system control circuit 38 operates to control the reversal of the tape running direction and to control the changeover switches 26, 28. The switches 26, 28 are set to terminal a during forward direction reproduction and to terminal b during return direction reproduction.

Figure 11:
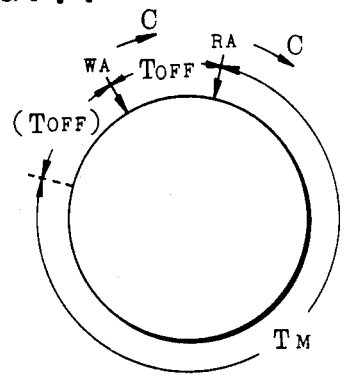
FIGS. 11 to 13 are views for explaining address changes in the signal delaying RAM shown in FIG. 10.
Figure 12:
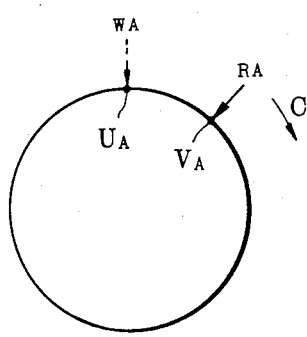
Figure 13:
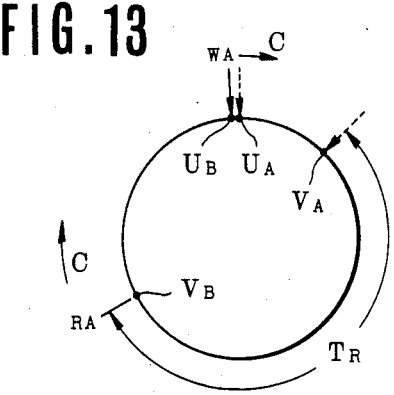

Reference is had to FIGS. 11 to 13 for explaining the playback operation with the auto-reverse function by means of the above described reproducing circuit. It is assumed that, with the recording pattern on the magnetic tape 6 as shown in FIG. 2, the operation of reversing the running direction is effected during forward direction reproduction in the first direction A at the 9th to 15th blocks and at such time that the reversal mark signal or the aforementioned optimum reversing position have been detected, the tape is caused to run in the second direction after the predetermined time $T_R$ so as to start the return reproduction. In FIGS. 11 to 13, the address space of the signal delaying RAM 30 is indicated by the circumference in the same manner as in FIGS. 7 to 9 described hereinabove.

During forward reproduction, the read address RA and the write address WA are travelling in the direction C on the circumference corresponding to the address space as shown for example in FIG. 11. The speed of movement of the read address RA (address increment speed) is maintained constant by the clock signals supplied from the timing generator 33 of FIG. 10 to the read address counter 32, whereas the speed of movement of the write address WA (address increment speed) is changed with minor fluctuations in the tape running speed because the write address makes direct use of the address portions of the respective blocks in the reproducing signals. It should however be noted that the position of the read address RA relative to the write address WA is automatically controlled so that a constant offset $T_{off}$ is maintained by the tape driving servo system including the subtractive circuit 34 and the offsetting circuit 35. The address offset $T_{off}$ is determined by the offset amount of the offsetting circuit 35.

Next, at the time point where the aforementioned movement reversal is started responsive to the detection of the optimum reversing position, the write address WA ceases to be moved and writing is discontinued, whereas the read address RA continues its movement at the aforementioned constant speed, as shown in FIG. 12. This is because the tape becomes substantially stationary and no playback signals are available during tape reversal. The position of the write address WA in the RAM address space at the time when the movement reversal is started is indicated as $U_A$ and the time of the read address RA is indicated as $V_A$.

At the time when the movement reversal is terminated, the magnetic tape 6 is started to run in the second direction so as to start the reproduction of the recording on the second or return track 7B and the write address WA is started to run in the direction C, as shown in FIG. 13. The position $U_B$ of the write address WA at the instant the reversal is terminated is determined by the block address obtained for the first time during the reproduction in the second or return direction. When the reversal has occurred at the aforementioned optimum reversing position, the position $U_B$ is substantially coincident with the position $U_A$ of the start of the reversal or slightly shifted therefrom in a direction which is opposite to the direction C. The position $V_B$ of the read address RA at the time of reversal is completed is advanced in the direction C from the position $V_A$ by the time required for movement reversal $T_R$. The capacity of the delay RAM 30 must be selected so that the position $V_B$ at the instant of the reversal termination does not exceed the aforementioned position $U_B$.

. After termination of the movement reversal and the start of the return direction reproduction, the tape speed is increased by the operation of the tape running servo system including the subtractive circuit 34 and the offsetting circuit 35 so that the movement of the write address WA in the direction C is accelerated and the write address becomes close to the read address RA. The distance between the addresses RA and WA is ultimately servo-controlled and approximately stabilized to the constant steady-state offset $T_{off}$, as shown in FIG. 11, so that the addresses RA and WA are moved in direction C at the approximately equal speed.

Thus, no omission of the signals written into the delaying RAM 30 takes place before or after tape reversal, while the read address RA is always moved in the direction C at a constant speed so as to permit reading of the transient signals. Also, in the steady-state forward or return reproduction condition shown in FIG. 11, the $T_{off}$ intervals before and after the write address WA represent a so-called jitter margin for compensating for fluctuations caused during tape running, whereas the remaining interval $T_M$ represents the reversal margin for compensating for fluctuations caused by tape reversal.

It should be noted that, while the block address of e.g. 8 bits is sufficient for identifying 256 blocks, the number of the blocks from the beginning until the end of the magnetic tape in the running direction thereof is extremely large so that the same block address will appear repeatedly at a constant period during tape running. It is therefore preferred that not only the comparison of the block addresses for the forward and return directions but also that the reversal marks are used so that the detection of the optimum reversing position by means of the address comparison output is validated only when the reversal mark signals are detected at the position where the movement reversal is required, as at the tape end. In the above embodiment, this is effected at the system control circuit 38 by taking the logical product (AND), for example, between the reversal mark detection signal and the optimum reversing position detection signal. Alternatively, the return reproducing head 21B is activated only when the reversal mark detection signal is obtained during the forward reproduction for reading out the return route addresses.

In the above described embodiment of the present invention, the time required for reversal between the forward movement and the return movement is compensated during the recording by the delay caused in the input signals by making use of the RAM 10 as an input signal delay means so that continuous trouble-free reverse recording is achieved without omission of the input signals recorded on the magnetic tape 6.

For the reproduction of the thus recorded magnetic tape 6, data are sequentially written into the RAM 30 which is the signal delay means in association with the addresses of the playback signals obtained from reproducing head 21 and the reading from the RAM is effected continually with the constant clock timing so that continuous trouble-free reverse playback is achieved without omission of the playback output signals. This is made possible by the fact that the playback signal data corresponding to the time required for tape reversal is stored twice to provide a reversal margin during the steady-state reproduction (at least under the impending movement reversal conditions).

According to an embodiment, the movement reversal is effected at the extreme position during reproduction where the signal omission is still prevented from occurring, so that the reversal margin is reduced and the memory capacity of the delay RAM 30 is minimized. In addition thereto, because of the smaller memory capacity, the time that elapses since the start of reproduction until the actual sound reproduction is also reduced.

Figure 14:
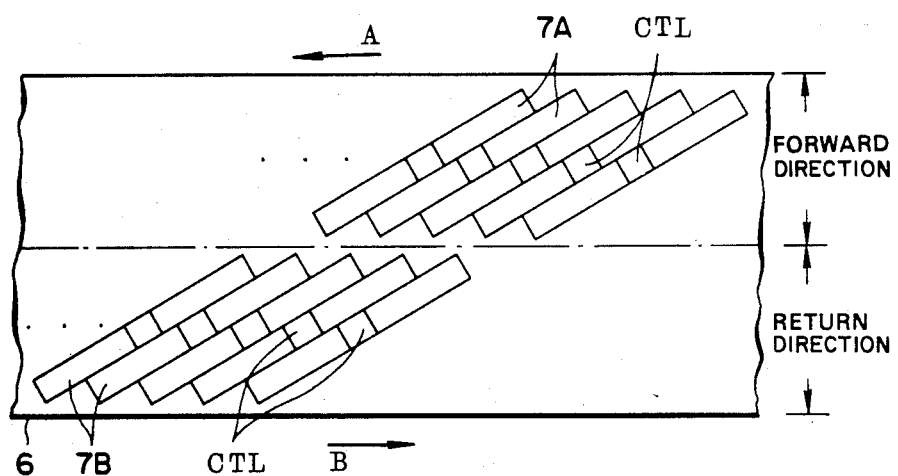
FIG. 14 is a plan view showing an example of the recording pattern on the magnetic tape for explaining a further embodiment of the present invention.

Although the present invention has been described hereinabove with respect to an application thereof to a stationary head type auto-reverse tape recorder, the present invention can also be applied to a rotary head type auto-reverse tape recorder as well. For example, FIG. 14 shows a reciprocating recording pattern on the magnetic tape 6 with the use of the rotary recording head. With the tape running in the direction A for forward direction recording, plural helical recording tracks 7A are sequentially formed in the direction opposite to the direction A and, with the tape running in the direction B for return direction recording, plural recording tracks 7B are sequentially recorded. In such case, a number of blocks, e.g. hundreds of blocks are formed as one frame on each helical recording track 7. One of these blocks may be used as a control block CTL in which may be included the aforementioned reversal mark information or the tracks so that it increases the error in the detection of the aforementioned optimum position.

With such rotary head type auto-reverse device, an axial error is increased by a factor of cot $\theta$, where $\theta$ represents an angle of inclination of the recording tracks so that it is increased to a larger error in the running direction. Thus it is essential that the movement reversal position be determined with a high accuracy. Therefore, the present invention can be applied most effectively to such rotary type recording devices.

It is to be noted that the present invention is not limited to the above described embodiments, but may also be applied to the case of arranging input signals in a block form and including the reversal mark or address information etc. in each block, wherein the frequency division system or the system providing independent signal data tracks and the control tracks can be adopted besides the time division system in which the signal data portion, reversal mark or the address information are arranged on the time axis.

According to the signal recording apparatus of the present invention, the input signals temporarily preceding the input signals recorded on the medium immediately before the tape reversal are recorded after the time immediately following the tape reversal so that the input signals can be recorded on the recording medium without signal omission thus providing for a continuous trouble-free signal recording.

In addition thereto, according to the signal recording and reproducing apparatus of the present invention, in the reproduction of the recording medium on which recording has been made by the above described signal recording system, the playback signals from the playback or reproducing head are taken out at least immediately before the movement reversal with a delay longer than the time required for movement reversal so that the signals can be taken out continuously from the delay means during reversal, thus providing for a continuous trouble-free reverse reproduction.

Also, the information concerning the return direction can be obtained during forward direction reproduction so that movement reversal can be effected at a position necessary and sufficient for auto-reverse reproduction, while the capacity of the signal delay memory adapted for preventing the playback signal omission may be reduced.

I claim:

1. A signal recording and reproducing apparatus wherein, after at least one of the recording head and the recording medium has made a relative movement in a first direction, said recording medium is moved in a second direction opposite to said first direction for reciprocatingly recording input signals, and wherein said recording medium is caused to reciprocatingly travel in said first and second directions for reproducing the recording with a reproducing head, characterized in that, during recording, means are provided for supplying said input signals to said recording head with a delay, the delay of the input signals during running in said second direction being longer than the delay of the input signals during running in said first direction and the difference between said delays selected so as to be longer than the time required for movement reversal from said first direction to said second direction; and during reproduction, means are provided for delaying the reproduced signals from said reproducing head, with delay of the reproduced signals prior to movement reversal selected so as to be longer than the delay of the reproduced signals after movement reversal, and the output signal supplied from said delay means comprises a continuous output signals, wherein the signals are reciprocatingly recorded on the recording medium, characterized in that reversal mark signals indicative of the reversal are recorded on said recording medium in the vicinity of the reversal position along with said input signals.

2. A signal recording apparatus wherein, after at least one of the recording head and the recording medium has made a relative movement in a first direction, said recording medium is moved in a second direction opposite to said first direction for reciprocatingly recording input signals on said recording medium, characterized in that means are provided for supplying said input signals to said recording head with a delay, and the amount of delay of the input signals during running in said second direction is set to be longer than the delay of the input signals during running in said first direction and the difference between these delays is selected to be longer than the time required for reversal of said recording medium from said first direction to said second direction, wherein the signals are reciprocatingly recorded on the recording medium, characterized in that reversal mark signals indicative of the reversal are recorded on said recording medium in the vicinity of the reversal position along with said input signals.

3. A signal recording and reproducing apparatus characterized in that the input signals and the addresses corresponding thereto are reciprocatingly recorded on a recording medium, the thus recorded signals are read out in both the forward and return directions during forward reproduction, and the thus read out forward direction addresses and the return direction addresses are compared to each other so as to determine the movement reversal position and to assume continuous uninterrupted data during reversal of the magnetic medium.

* * * * *